(12) United States Patent
Kaijala et al.

(10) Patent No.: US 7,263,906 B2
(45) Date of Patent: Sep. 4, 2007

(54) SEAT BELT TENSION SENSOR

(75) Inventors: Murray Kaijala, Elkhart, IN (US); Joseph Kip Bahr, Elkhart, IN (US); Michael Wills, Highland Village, TX (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 11/366,294

(22) Filed: Mar. 2, 2006

(65) Prior Publication Data

US 2006/0144167 A1 Jul. 6, 2006

Related U.S. Application Data

(63) Continuation-in-part of application No. 11/235,414, filed on Sep. 26, 2005, which is a continuation-in-part of application No. 10/388,816, filed on Mar. 14, 2003, now Pat. No. 7,086,297, which is a continuation-in-part of application No. 09/923,151, filed on Aug. 6, 2001, now Pat. No. 6,578,432, which is a continuation-in-part of application No. 09/884,615, filed on Jun. 19, 2001, now Pat. No. 6,647,811.

(51) Int. Cl.
*G01L 5/04* (2006.01)

(52) U.S. Cl. .................. 73/862.391; 73/862.392; 73/862.393; 73/862.451

(58) Field of Classification Search .................. 73/862.391–862.393, 862.451
See application file for complete search history.

(56) References Cited

U.S. PATENT DOCUMENTS

| 2,984,102 | A | | 5/1961 | Soderholm |
| 3,805,600 | A | | 4/1974 | Powell et al. |
| 4,616,504 | A | * | 10/1986 | Overcash et al. ......... 73/118.1 |
| 4,943,087 | A | | 7/1990 | Sasaki |
| 5,060,977 | A | | 10/1991 | Saito |
| 5,181,739 | A | | 1/1993 | Bauer |
| 5,244,231 | A | | 9/1993 | Bauer et al. |
| 5,309,135 | A | | 5/1994 | Langford |
| 5,454,591 | A | | 10/1995 | Mazur et al. |
| 5,494,311 | A | | 2/1996 | Blackburn |
| 5,570,903 | A | | 11/1996 | Maister |
| 5,583,476 | A | | 12/1996 | Langford |
| 5,605,348 | A | | 2/1997 | Blackburn |
| 5,618,056 | A | | 4/1997 | Schoos |
| 5,636,864 | A | | 6/1997 | Hori |
| 5,765,774 | A | | 6/1998 | Maekawa |
| 5,960,523 | A | | 10/1999 | Husby |
| 5,965,827 | A | | 10/1999 | Stanley |

(Continued)

FOREIGN PATENT DOCUMENTS

WO WO99/12012 3/1999

*Primary Examiner*—Edward Lefkowitz
*Assistant Examiner*—Freddie Kirkland, III
(74) *Attorney, Agent, or Firm*—Mark P. Bourgeois (57) ABSTRACT

A seat belt tension sensor for measuring the amount of tension in a vehicle seat belt. The seat belt tension sensor has a housing and an anchor plate. A lever is mounted in the housing. The lever holds a magnet. A sensor is mounted to the housing. The sensor generates an electrical signal in response to relative movement between the magnet and the sensor. The electrical signal changes in proportion to the amount of tension on the seat belt. A spring is mounted in association with the housing and the anchor plate. The spring biases the housing from the anchor plate.

21 Claims, 8 Drawing Sheets

U.S. PATENT DOCUMENTS

| | | |
|---|---|---|
| 5,996,421 A | 12/1999 | Husby |
| 6,081,759 A | 6/2000 | Husby |
| 6,151,540 A | 11/2000 | Anishetty |
| 6,161,439 A | 12/2000 | Stanley |
| 6,205,868 B1 | 3/2001 | Miller |
| 6,209,915 B1 | 4/2001 | Blakesley |
| 6,211,668 B1 | 4/2001 | Duesler |
| 6,230,088 B1 | 5/2001 | Husby |
| 6,264,236 B1 | 7/2001 | Aoki |
| 6,264,281 B1 | 7/2001 | Dukatz |
| 6,301,977 B1 | 10/2001 | Stojanovski |
| 6,307,977 B1 | 10/2001 | Eldridge et al. |
| 6,336,371 B1 | 1/2002 | O'Boyle |
| 6,400,145 B1 | 6/2002 | Chamings et al. |
| 6,450,534 B1 | 9/2002 | Blakesley |
| 6,502,860 B1 * | 1/2003 | Siegfried et al. ........ 280/801.1 |
| 6,520,540 B1 | 2/2003 | Siegfried et al. |
| 6,554,318 B2 | 4/2003 | Kohut |
| 6,578,432 B2 | 6/2003 | Blakesley |
| 6,647,811 B2 | 11/2003 | Blakesley |
| 6,688,185 B2 | 2/2004 | Knox et al. |
| 6,729,194 B2 | 5/2004 | Kaijala |
| 6,776,056 B2 | 8/2004 | Garver |
| 6,851,503 B2 * | 2/2005 | Almaraz et al. ............ 180/268 |
| 6,858,835 B2 * | 2/2005 | Smith ...................... 250/231.1 |
| 6,860,160 B2 * | 3/2005 | Curtis et al. ........... 73/862.391 |
| 7,055,400 B2 * | 6/2006 | Curtis et al. ........... 73/862.393 |
| 2001/0042981 A1 | 11/2001 | Kohut |
| 2001/0054323 A1 | 12/2001 | Faigle |
| 2002/0024205 A1 | 2/2002 | Curtis |
| 2002/0035878 A1 | 3/2002 | Norton |
| 2003/0066362 A1 | 4/2003 | Lee et al. |
| 2003/0150283 A1 | 8/2003 | Stanley et al. |
| 2003/0184076 A1 | 10/2003 | Devereaux et al. |
| 2004/0017073 A1 | 1/2004 | Pavlov et al. |
| 2004/0231436 A1 | 11/2004 | Barnabo |

\* cited by examiner

SEAT BELT TENSION SENSOR

CROSS-REFERENCE TO CO-PENDING AND RELATED APPLICATIONS

This application is a continuation-in-part of U.S. patent application Ser. No. 11/235,414, filed Sep. 26, 2005 and titled, "Seat Belt Tension Sensor", which is a continuation-in-part of U.S. patent application Ser. No. 10/388,816, filed Mar. 14, 2003 now U.S. Pat. No. 7,086,297 and titled, "Seat Belt Tension Sensor Having Shock Isolation", which is a continuation-in-part of U.S. patent application Ser. No. 09/923,151, filed Aug. 6, 2001, now U.S. Pat. No. 6,578,432 and titled, "Seat Belt Tension Sensor", which is a continuation-in-part of U.S. patent application Ser. No. 09/884,615, filed Jun. 19, 2001 and titled, "Seat Belt Tension Sensor", now U.S. Pat. No. 6,647,811.

This application is related to U.S. Pat. No. 6,729,194, issued May 4, 2004 and titled, "Hall Effect Seat Belt Tension Sensor".

The foregoing pending applications and issued patents are herein incorporated by reference in their entirety.

BACKGROUND

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules under FMVSS 208 requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY

It is a feature of the present invention to provide a seat belt tension sensor for use with a seat belt in a vehicle.

Another feature of the invention is to provide a seat belt tension sensor that includes a housing with an anchor plate and a sensor mounted in the housing. A lever is mounted to the housing. A magnet is mounted to the lever. The sensor generates an electrical signal in response to relative movement between the sensor and the magnet. The electrical signal changes in proportion to the amount of tension on the seat belt. A spring biases the housing from the anchor plate.

BRIEF DESCRIPTION OF THE DRAWINGS

It is noted that the drawings of the invention are not to scale.

DETAILED DESCRIPTION

The present invention is a seat belt tension sensor. Referring to FIGS. 1-4, a seat belt tension sensor assembly 20 is shown. Assembly 20 has a housing 40 and anchor plate 60. Housing 40 is fastened between a seat belt webbing 30 and a structural part of the vehicle such as a floor (not shown). The belt webbing 30 has an end 31, an end 32, a belt loop 33 and stitching 34 that retains end 32.

Housing 40 has a bottom portion 41, top portion 42, flange 43, hole 44, spring channel 45, bearing rail 46 and sensor mounting area 47. A cavity 48 is located within housing 40. The bottom portion 41 and top portion 42 connect together to form housing 40 and are held together by snap fitting tabs 42a in to slots 42b. Alternatively, ultrasonic welding along lip 41A can connect portions 41 and 42 together. Housing portion 42 has a recess or narrow portion 49 on an end of the housing where the seat belt wraps around.

Figure 1:
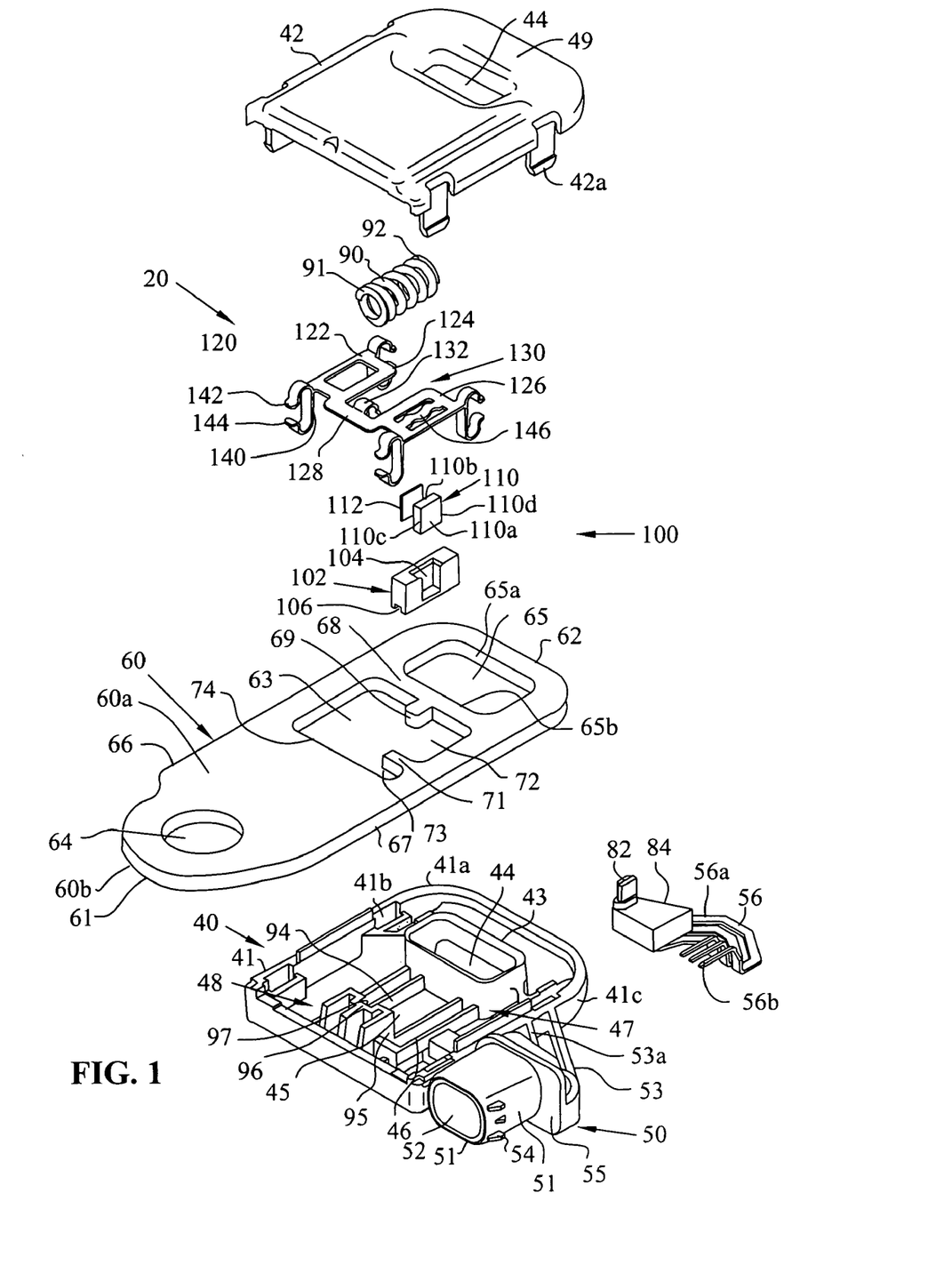
FIG. 1 is a perspective exploded view of a seat belt tension sensor in accordance with the present invention.
Figure 2:
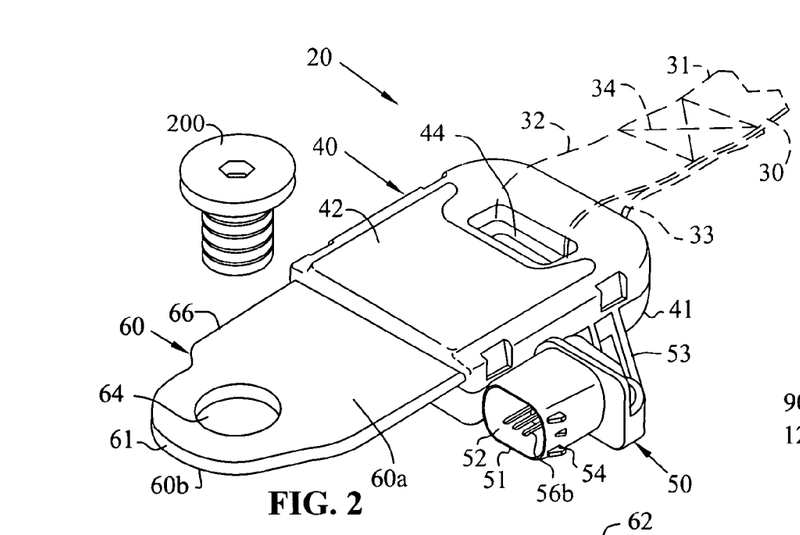
FIG. 2 is an assembled view of FIG. 1.
Figure 3:
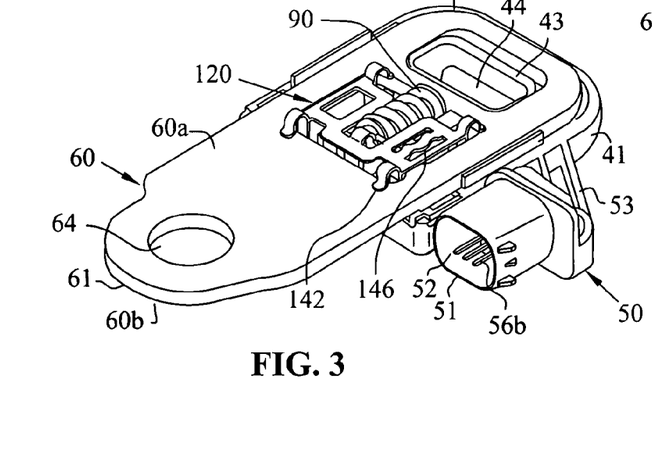
FIG. 3 is a perspective view of FIG. 2 with a cover removed.
Figure 4:
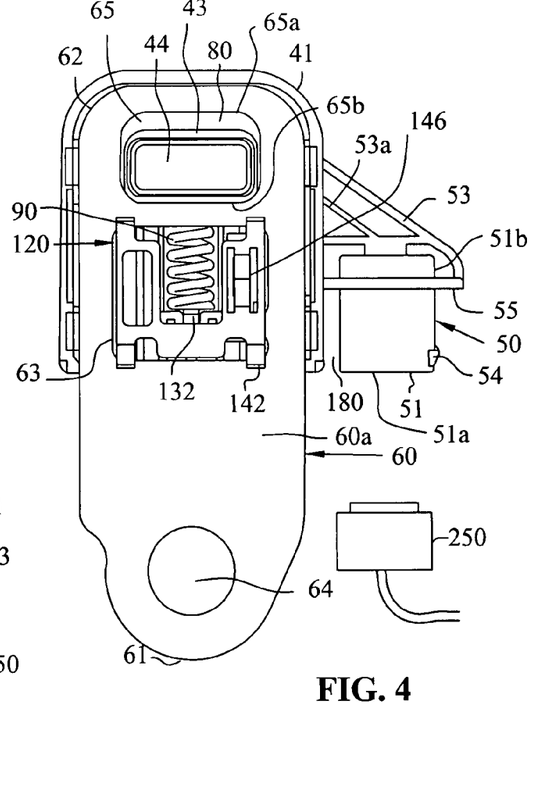
FIG. 4 is a top view of FIG. 3.

An integral connector 50 extends from housing bottom portion 41. Connector 50 is integrally molded into housing portion 41 during injection molding of the housing. Integral connector 50 has a shroud 51 that has a recess 52. Shroud 51 has shroud ends 51A and 51B. Several latch tabs 54 are mounted on shroud 51. Plate 55 supports shroud 51. Shroud end 51A extends from one side of plate 55 and shroud end 51B extends from the other side of plate 55. A molded support or bracket 53 reinforces the attachment between integral connector 50 and housing portion 41. Molded support or bracket 53 extends between housing side 41C and a plate 55. Plate 55 connects between shroud 51 and side 41C. Bracket 53 has ribs or webbing 53A that adds additional mechanical strength to bracket 53. Shroud 51 is spaced from side 41C by an airgap 180 (FIG. 4).

Three electrically conductive metal terminals 56 have ends 56A and 56B. Terminals 56 are integrally molded into housing portion 41 during injection molding of the housing. Terminals 56 extend between sensor mounting area 47 in housing 40 and recess 52. Terminal ends 56A extend into sensor mounting area 47 and terminal ends 56B extend into recess 52 of shroud 51. Housing 41, bracket 53, plate 50 and shroud 51 can be molded from plastic. The plastic surrounds and support each terminal and insulates the terminals. Terminal end 56A is adapted to be connected to an external wire harness 250 (FIG. 4). The wire harness would fit over shroud 51 and be retained by latch tabs 54. Wire harness 250 would connect with an airbag controller (not shown).

In an alternative embodiment, terminals 56 could be press-fit into shroud 51, support 53 and housing 41. In this example, terminals 56 are retained by friction between the terminals and the surrounding structure primarily support 53.

The use of integral connector 50 has many advantages. Integral connector 50 eliminates the need for a separate wire harness and connector. Since integral connector 50 is rigidly held by bracket 53, a separate strain relief mechanism is not required. If a wire harness and connector was used, a separate strain relief mechanism would be required to prevent the wire harness from being pulled out of housing 40.

Integral connector 50 eliminates the need for a separate printed circuit board because hall effect device 82 is mounted directly to terminals 56. Alternatively, a printed circuit board could be mounted by soldering directly to terminals 56 and the hall effect device mounted to the printed circuit board.

A metal anchor plate 60 is fitted within housing 40. Anchor plate 60 has a top surface 60A and bottom surface 60B. Anchor plate 60 includes ends 61 and 62, a cutout 63, apertures 64 and 65 and sides 66 and 67. Anchor plate 60 further has edges 65A and 65B that are next to aperture 65. Arm 68 extends between sides 66 and 67 and separates aperture 65 and cutout 63. A projection 69 extends from arm 68 into cutout 63. Projection 71 extends into cutout 63. Projection 71 and arm 68 define a sensor mounting opening 72. Notch 73 is defined between projection 71 and an edge 74 of cutout 63.

Anchor plate 60 is mounted in cavity 48. Aperture 65 goes over and surrounds flange 43. A gap 80 (see FIG. 4) is formed between flange 43 and aperture 65.

Seat belt webbing 30 is attached through hole 44 and aperture 65. The end 32 of webbing 30 is routed through hole 44 and aperture 65, wrapped back onto itself forming loop 33 and sewn with stitching 34 to secure the seat belt webbing to assembly 20.

A coil spring 90 is mounted in spring channel 45. Spring 90 has ends 91 and 92. Spring channel 45 is defined by walls 94, 95 and 96 in housing 40. Spring end 92 is mounted over projection 69. The other spring end 91 rests against wall 96. Spring 90 is adapted to bias anchor plate 60 from housing 40 such that gap 80 is open. A slot 97 is located in wall 96.

A magnetic field sensor or hall effect device 82 is mounted to terminal end 56A and extends upwardly into sensor mounting area 47. Additional electronic components (not shown), such as resistors, capacitors, inductors, transistors or integrated circuits can also be attached to terminal ends 56A to condition the signal from the hall effect device 82. Since, terminals 56 are insert molded, hall effect device 82 is retained in the proper position in sensor mounting area 47. Hall effect device 82 can be mounted to terminal ends 56A by soldering or laser welding.

Hall effect device 82 and ends 56a can be encapsulated with a sealant 84 such as silicone for protection.

Figure 5:
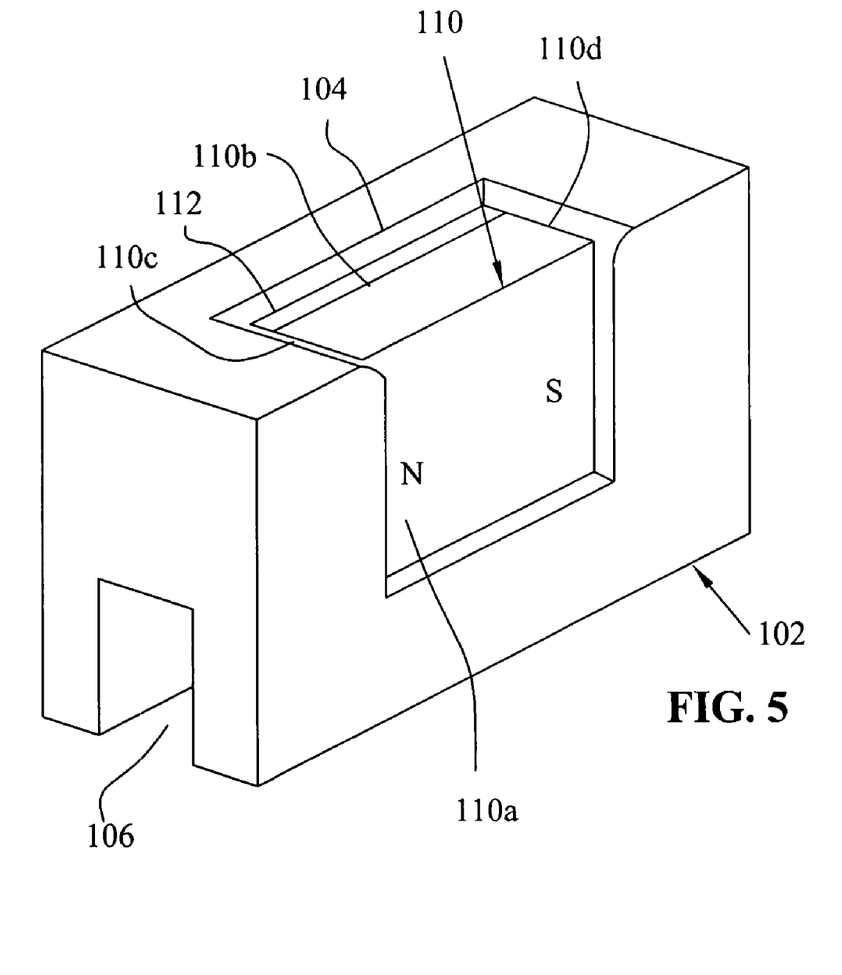
FIG. 5 is an enlarged view of a magnet carrier of the present invention.

A magnetic field generator or magnet assembly 100 includes a magnet carrier 102 and a magnet 110. Magnet carrier 102 has a cavity 104 and a slot or mortise 106. The magnet carrier is preferably formed from an insulative material such as a plastic. A magnet 110 has sides 110A and 110B and ends 110C and 110D. End 110C can be a north pole and end 110D can be a south pole. A steel pole piece 112 may be mounted on magnet side 110B. Pole piece 112 improves the shape of and guides the flux field generated by magnet 110. Pole piece 112 may be omitted if desired. Magnet 110 and pole piece 112 are mounted in and retained by cavity 104.

Magnet 110 can be formed from molded ferrite or can be formed from samarium cobalt or neodymium iron boron. Magnet 110 has a changing polarity along the length of the magnet.

The magnet 110 could also be a tapered magnet or could be a magnet that has a variable field strength along its length. The magnet 110 may have a variable polarization or a variable magnetic domain alignment along its length. Magnet 110 may also comprise more than one magnet and may be several magnets.

Magnet assembly 100 is mounted in sensor opening 72 and rests on rail 46. Bearing rail 46 extends into mortise or slot 106 such that magnet carrier 102 is supported by bearing rail 46. Magnet carrier 102 slides on bearing rail 46 as the housing 40 moves relative to the anchor plate 60.

A spring carriage 120 is between anchor plate 60 and housing 40. Spring carriage 120 is mounted in cutout 63. Spring carriage 120 attenuates motions other than in the primary load direction between anchor plate 60 and housing 40. In other words, spring carriage 120 prevents rattling. Spring carriage 120 has a u-shaped body 122 that has legs 124, 126 and a bottom portion 128. An opening 130 is located between legs 124 and 126. A spring tab 132 extends into opening 130.

Four spring fingers 140 are mounted to body 122. One spring finger is located at each corner of body 122. Spring fingers 140 have an upper tang 142 and a lower tang 144. Spring fingers 140 extend from cutout 63 onto the top and bottom surfaces of anchor plate 60. Upper tang 142 is in contact with surface 60A. Lower tang 144 is in contact with surface 60B. Anchor plate 60 is squeezed between tangs 142 and 144.

Spring tab 132 fits into slot 97 and is able to press against spring 90. Spring tab 132 applies a reverse force to spring 90 and assists with overcoming geometrical tolerance issues due to variations in the dimensions of the components. Spring tab 132 also assists with alignment of spring 90 with respect to housing 40.

A bar 146 extends over magnet carrier 102. Bar 146 retains magnet carrier 102 in opening 72.

Seat belt tension sensor 20 can be attached to a vehicle floor or seat or other member (not shown) by a fastener 200 such as a bolt, rivet or screw. Fastener 200 goes through aperture 64 and is attached to a vehicle structure or seat. The fastener shown is threaded; however, other types of fasteners would work such as a rivet.

When a tension is applied to seat belt 30, housing 40 moves relative to the fixed anchor plate 60 resulting in the compression of spring 90. As housing 40 moves, hall effect device 82 is moved relative to magnet assembly 100 which is held fixed by fastener 200 through anchor plate 60.

As the tension in the seat belt increases, housing 40 will move further in relation to anchor plate 60. This causes the hall effect device 82 to move. At the same time bearing rail 46 slides within slot 106. The total travel distance can be about 1 to 3 millimeters. The hall effect device is located adjacent to magnet 110. A small air gap is located between hall effect device 82 and magnet 110. The hall effect device outputs an electrical signal that is proportional to the flux density of the perpendicular magnetic field that passes through the device. Since, the magnets have a north and south pole, the strength of the magnetic field varies as the polarity changes from one pole to the other along the length of the magnet.

Therefore, the resulting electrical output signal of the hall effect devices changes in proportion to the amount of tension in seat belt 30. This electrical signal is processed by electronic circuitry and provided to an external electrical circuit through terminals 56 to a conventional air bag controller or occupant classification module (not shown). The air bag controller can then use the seat belt tension information to compute a more accurate profile of the seat occupant and use that information to control deployment of the airbag.

The movement of housing 40 relative to the fixed anchor plate 60 is limited by the interaction of flange 43 with edges 65A and 65B. In a resting position with no tension placed on seat belt 30, spring 90 applies a force between arm 68 and wall 96 which results in the flange 43 moving into contact with edge 65B. After flange 43 touches edge 65B, housing 40 can no longer move toward end 61 of anchor plate 60. This position is defined as a rest or no tension position.

As tension is applied to seat belt 30, housing 40 will move away from end 61 of anchor plate 60 and spring 90 will start to be compressed. Housing 40 will move relative to anchor plate 60 and therefore hall effect device 82 will move relative to magnet 110.

As further tension is applied to seat belt 30, flange 43 will move into contact with edge 65A. After flange 43 touches edge 65A, housing 40 can no longer move away from end 61 of anchor plate 60. This position is defined as an overload position.

Any further tension applied to seat belt 30 after flange 43 engages edge 65B will be transferred to anchor plate 60 and bolt 200. The transfer of additional tension prevents further compression of spring 90 and protects magnet assembly 100 and hall effect device 82 from damage due to the possible application of large tension forces. This can be referred to as overload protection.

The use of seat belt tension sensor assembly 20 has many advantages. Seat belt tension sensor assembly 20 allows for the measurement of seat belt tension in a compact package with a small number of components. Seat belt tension sensor assembly 20 has a small amount of motion while still being able to determine the amount of tension in a seat belt. Seat belt tension sensor assembly 20 has an overload protection mechanism that prevents excessive seat belt tension from damaging the sensing components.

The seat belt tension sensor of the present invention has additional advantages. It allows accurate sensing of seat belt tension, without excessive movement of the seat belt. The seat belt tension sensor allows an airbag controller to make better decisions as to when and how to deploy and airbag based upon more accurate seat occupant information. In the case of a child's car seat being strapped into into a car seat, the seat belt tension sensor in conjunction with a seat weight sensor allows the airbag controller to properly compute that the seat occupant has a low weight and to prevent deployment of the airbag.

While the housing with an integral connector was shown used in combination with a magnet and magnetic field sensor, any suitable type of sensor can be used with the integral connector. For example a strain gage sensor could be used in combination with an integral connector. Other sensors such as inductive, optical, capacitive or pressure could also be used with an integral connector.

Seat Belt Tension Sensor Embodiment Using a Lever

Referring to FIGS. 6-12, a seat belt tension sensor assembly 205 is shown. Assembly 205 has a housing 40 and anchor plate 60. Housing 40 is fastened between a seat belt webbing 30 and a structural part of the vehicle such as a floor (not shown). The belt webbing 30 has an end 31, an end 32, a belt loop 33 and stitching 34 that retains end 32.

Figure 6:
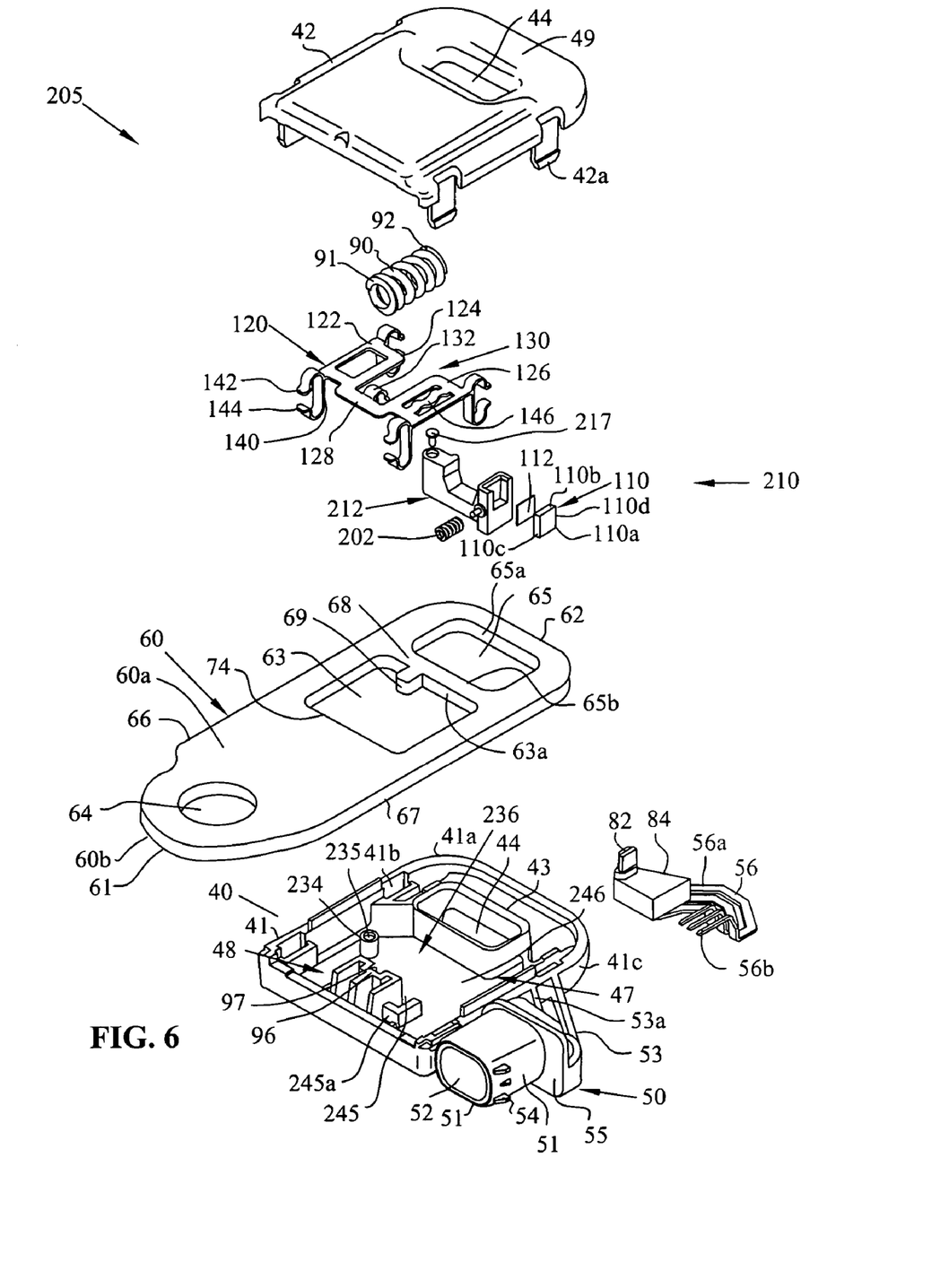
FIG. 6 is a perspective exploded view of a seat belt tension sensor using a lever in accordance with the present invention.
Figure 7:
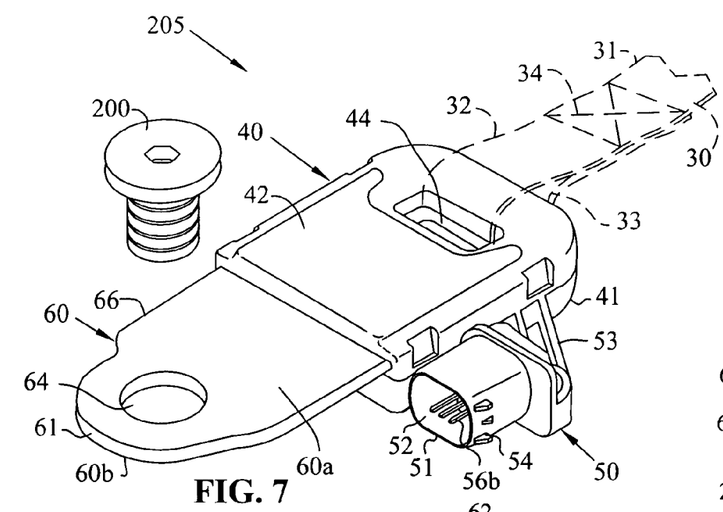
FIG. 7 is an assembled view of FIG. 6.
Figure 8:
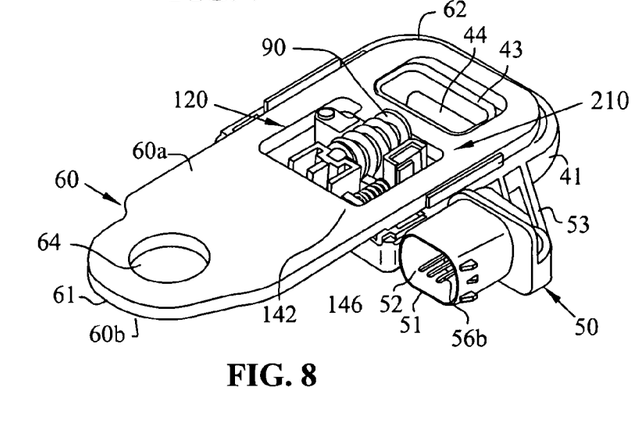
FIG. 8 is a perspective view of FIG. 7 with a cover removed.
Figure 9:
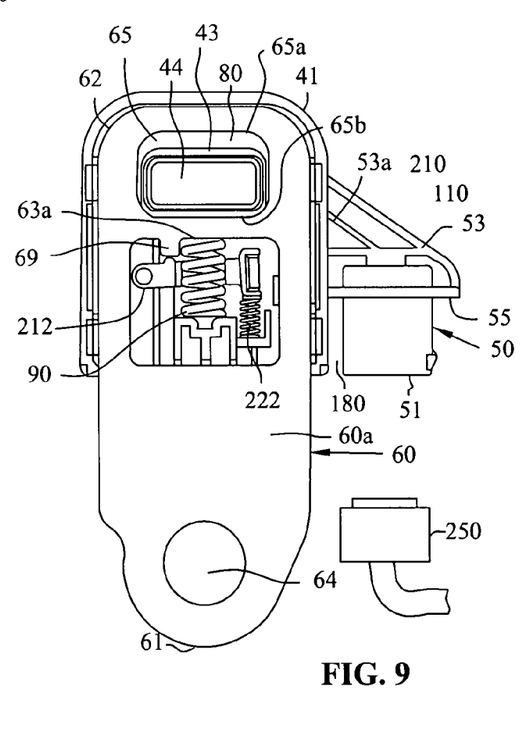
FIG. 9 is a top view of FIG. 8.

Housing 40 has a bottom portion 41, top portion 42, flange 43, hole 44, sensor mounting area 47. A cavity 48 is located within housing 40. The bottom portion 41 and top portion 42 connect together to form housing 40 and are held together by snap fitting tabs 42a in to slots 42b. Alternatively, ultrasonic welding along lip 41A can connect portions 41 and 42 together. Housing portion 42 has a recess or narrow portion 49 on an end of the housing where the seat belt wraps around.

Bottom portion 41 has several features. Bottom portion 41 has a bottom surface 246, a lever mounting area 236, a pivot post 234 extending upwardly from surface 246 and a return spring channel 245. Pivot post 234 has a hole 235.

An integral connector 50 extends from housing bottom portion 41. Integral connector 50 is the same as previously described for FIGS. 1-4.

A metal anchor plate 60 is fitted within housing 40. Anchor plate 60 has a top surface 60A and bottom surface 60B. Anchor plate 60 includes ends 61 and 62, a cutout 63, apertures 64 and 65 and sides 66 and 67. Anchor plate 60 further has edges 65A and 65B that are next to aperture 65. Arm 68 extends between sides 66 and 67 and separates aperture 65 and cutout 63. A projection 69 extends from arm 68 into cutout 63.

Anchor plate 60 is mounted in cavity 48. Aperture 65 goes over and surrounds flange 43. A gap 80 (see FIG. 9) is formed between flange 43 and aperture 65.

Seat belt webbing 30 is attached through hole 44 and aperture 65. The end 32 of webbing 30 is routed through hole 44 and aperture 65, wrapped back onto itself forming loop 33 and sewn with stitching 34 to secure the seat belt webbing to assembly 20.

Figure 12:
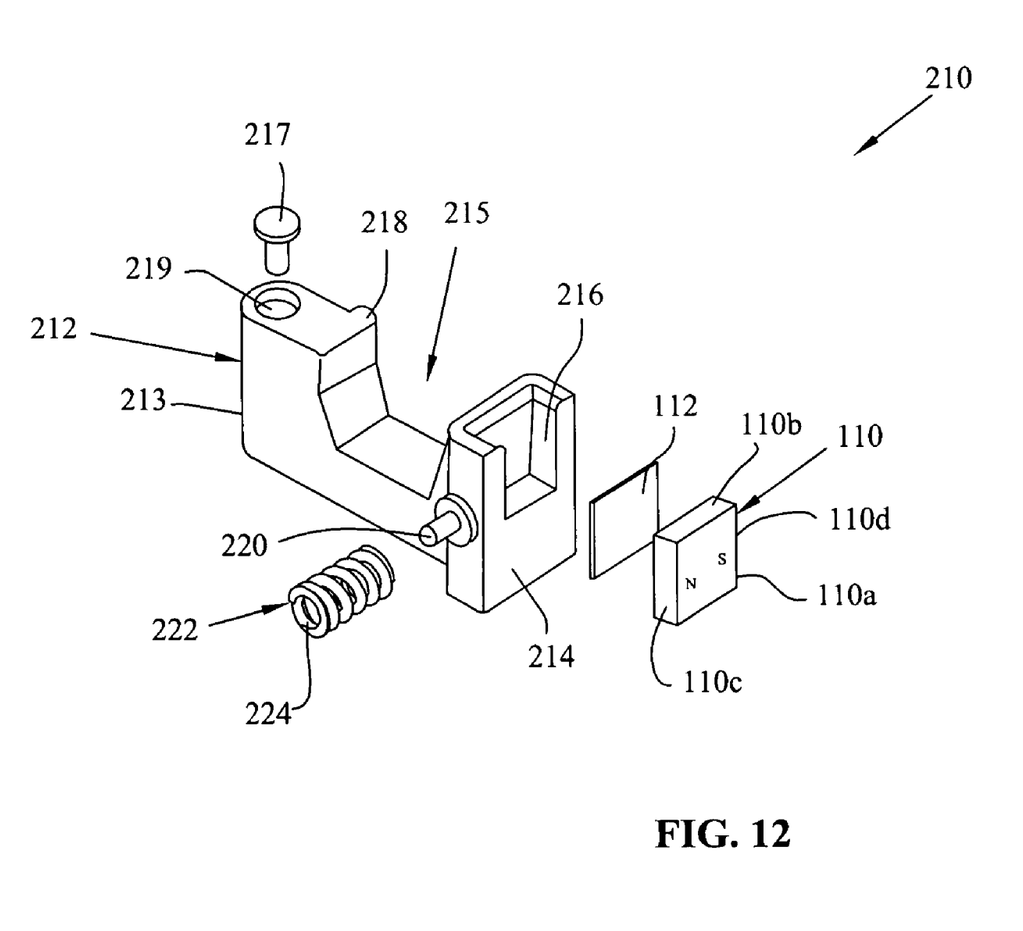
FIG. 12 is an enlarged view of the lever of FIG. 6.

Turning to FIG. 12, a lever 212 is shown. Lever 212 has ends 213 and 214, a cavity 216, a spring slot 215 and an aperture 219. A projection 218 extends away from one side of lever 212 and a post 220 extends away from the other side of lever 212. Return coil spring 222 has a bore 224. Return spring 222 fits over post 220. Pin 217 fits into aperture 219 and mates with pivot post 234. Pin 217 extends through aperture 219 and into hole 235. Lever 212 is mounted in cutout 63.

A magnetic field generator or magnet assembly 210 includes lever 212 and magnet 110. Lever 212 is preferably formed from an insulative material such as a plastic. Magnet 110 has sides 110A and 110B and ends 11C and 110D. End 11C can be a north pole and end 110D can be a south pole. A steel pole piece 112 may be mounted on magnet side 110B. Pole piece 112 improves the shape of and guides the flux field generated by magnet 110. Pole piece 112 may be omitted if desired. Magnet 110 and pole piece 112 are mounted in and retained by cavity 216.

Magnet 110 can be formed from molded ferrite or can be formed from samarium cobalt or neodymium iron boron. Magnet 110 has a changing polarity along the length of the magnet.

The magnet 110 could also be a tapered magnet or could be a magnet that has a variable field strength along its length. The magnet 110 may have a variable polarization or a variable magnetic domain alignment along its length. Magnet 110 may also comprise more than one magnet and may be several magnets.

With continued reference to FIGS. 6-12, magnet assembly 210 is mounted in cutout 63 and in lever mounting area 236. Lever 212 is mounted in lever mounting area 236 and retained by pin 217. Pin 217 fits into aperture 219 and mates with pivot post 234. Pin 217 allows lever 212 to rotate with pin 217 being the axis of rotation. As lever 212 rotates, magnet 110 travels along a path or slight arc.

A coil spring 90 is mounted between cutout edge 63a and walls 96 and 97. Spring 90 passes through spring slot 215. Spring 90 has ends 91 and 92. Spring end 92 is mounted adjacent edge 63a. The other spring end 91 rests against walls 96 and 97. Spring 90 is adapted to bias anchor plate 60 from housing 40 such that gap 80 is open. A slot 98 is defined between walls 96 and 97. While one coil spring was shown, two or more coil springs could be used. Alternatively, other types of springs could be used such as leaf springs.

Lever return spring 222 is mounted in return spring channel 245 between return spring wall 245A and lever end 214 over post 220. Spring 222 is adapted to bias lever end 214 away from spring channel wall 245A.

A magnetic field sensor or hall effect device 82 is mounted to terminal end 56A and extends upwardly into sensor mounting area 47. Additional electronic components (not shown), such as resistors, capacitors, inductors, transistors or integrated circuits can also be attached to terminal ends 56A to condition the signal from the hall effect device 82. Since, terminals 56 are insert molded, hall effect device 82 is retained in the proper position in sensor mounting area 47. Hall effect device 82 can be mounted to terminal ends 56A by soldering or laser welding.

Hall effect device 82 and ends 56a can be encapsulated with a sealant 84 such as silicone for protection.

Hall effect sensor 82 is mounted adjacent or juxtaposed to magnet 110 such that an airgap 230 is defined between sensor 82 and magnet 110. Lever 212 allows magnet 110 to move relative to sensor 82.

A spring carriage 120 is between anchor plate 60 and housing 40. Spring carriage 120 is mounted in cutout 63. Spring carriage 120 attenuates motions other than in the primary load direction between anchor plate 60 and housing 40. In other words, spring carriage 120 prevents rattling. Spring carriage 120 has a u-shaped body 122 that has legs 124, 126 and a bottom portion 128. An opening 130 is located between legs 124 and 126. A spring tab 132 extends into opening 130.

Four spring fingers 140 are mounted to body 122. One spring finger is located at each corner of body 122. Spring fingers 140 have an upper tang 142 and a lower tang 144. Spring fingers 140 extend from cutout 63 onto the top and bottom surfaces of anchor plate 60. Upper tang 142 is in contact with surface 60A. Lower tang 144 is in contact with surface 60B. Anchor plate 60 is squeezed between tangs 142 and 144.

Spring tab 132 fits into slot 98 and is able to press against spring 90. Spring tab 132 applies a reverse force to spring 90 and assists with overcoming geometrical tolerance issues due to variations in the dimensions of the components. Spring tab 132 also assists with alignment of spring 90 with respect to housing 40.

A bar 146 extends over lever end 214 and magnet 110. Spring carriage 120 retains lever 212 and magnet 110 in lever mounting area 236.

Seat belt tension sensor 205 can be attached to a vehicle floor or seat or other member (not shown) by a fastener 200 such as a bolt, rivet or screw. Fastener 200 goes through aperture 64 and is attached to a vehicle structure or seat. The fastener shown is threaded; however, other types of fasteners would work such as a rivet.

Figure 10:
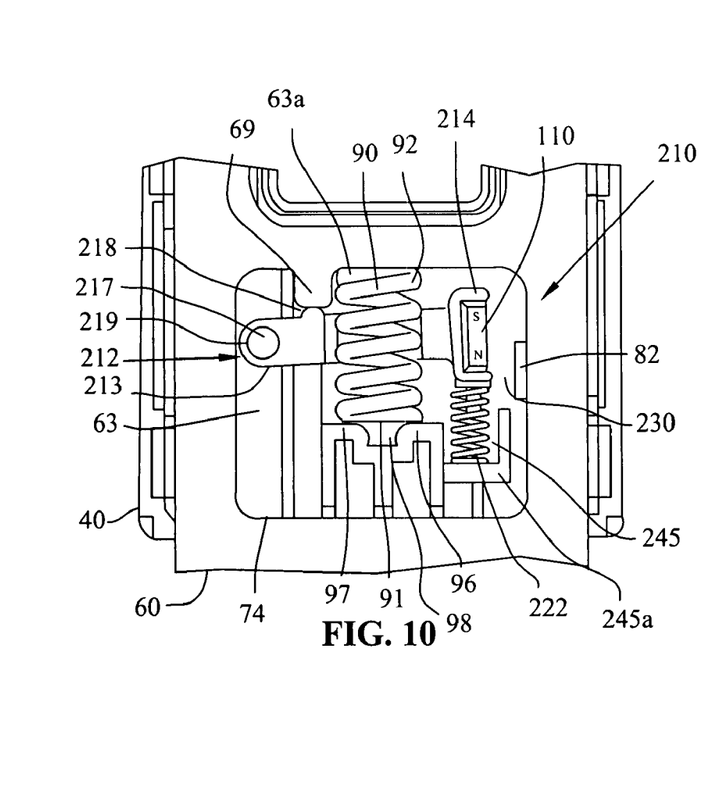
FIG. 10 is an enlarged view FIG. 9 showing the seat belt tension sensor in an unloaded state without applied seat belt tension.
Figure 11:
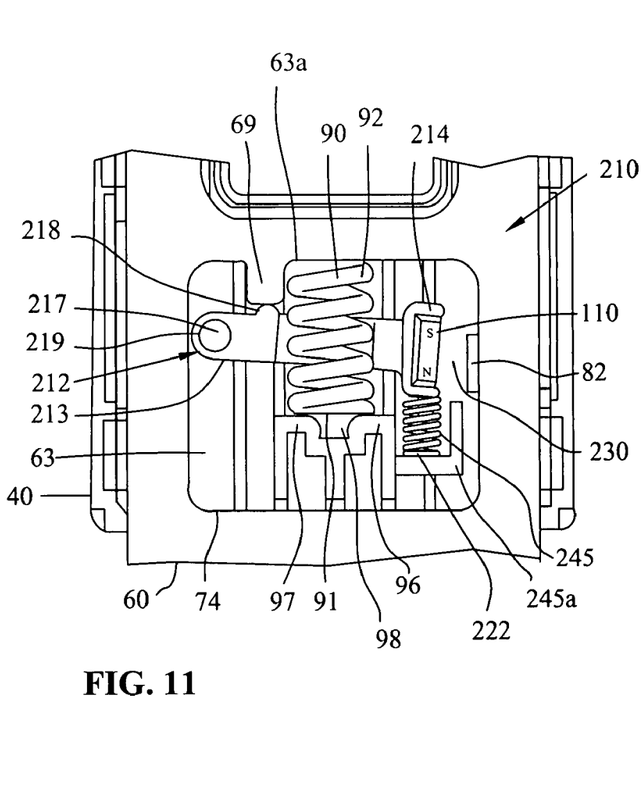
FIG. 11 is an enlarged view FIG. 9 showing the seat belt tension sensor in a loaded state with applied seat belt tension.

When a tension is applied to seat belt 30, housing 40 moves relative to the fixed anchor plate 60 resulting in the compression of spring 90. As housing 40 moves, projection 218 is forced into contact with projection 69 causing the rotation of lever 212 about pin 217 which causes lever end 214 to move toward edge 74. At the same time rotation of lever 212 causes return spring 222 to be compressed. At the same time hall effect device 82 is moved in the direction of seat belt tension. The anchor plate 60 is held in a fixed position by fastener 200.

As the tension in the seat belt increases, housing 40 will move further in relation to anchor plate 60. This causes lever 212 to rotate further, magnet 110 to rotate across hall effect device 82 and causes hall effect device 82 to further move.

Lever 212 causes the motion between housing 40 and anchor plate 60 to be translated. Housing 40 will typically travel a total distance of 1 millimeter when seat belt tension is applied. Lever 212 will translate force into motion. The 1 millimeter of motion between the housing and the anchor plate results in a total travel distance of 3 millimeters for lever end 214 and magnet 110. In other words, magnet 110 will travel a total distance of approximately 3 millimeters. The hall effect device is located adjacent to magnet 110. A small air gap 230 is located between hall effect device 82 and magnet 110.

It is noted that when seat belt tension is applied, that magnet 110 is moving in one direction and that the hall effect device 82 is moving in the opposite direction. Hall effect device 82 will travel 1 millimeter in the same travel direction as housing 40 which is also the travel direction of the seat belt.

The hall effect device outputs an electrical signal that is proportional to the flux density of the perpendicular magnetic field that passes through the device. Since, the magnets have a north and south pole, the strength of the magnetic field varies as the polarity changes from one pole to the other along the length of the magnet.

Therefore, the resulting electrical output signal of the hall effect devices changes in proportion to the amount of tension in seat belt 30. This electrical signal is processed by electronic circuitry and provided to an external electrical circuit through terminals 56 to a conventional air bag controller or occupant classification module (not shown). The air bag controller can then use the seat belt tension information to compute a more accurate profile of the seat occupant and use that information to control deployment of the airbag.

The movement of housing 40 relative to the fixed anchor plate 60 is limited by the interaction of flange 43 with edges 65A and 65B. In a resting position with no tension placed on seat belt 30, spring 90 applies a force between arm 68 and walls 96 and 97 which results in the flange 43 moving into contact with edge 65B. After flange 43 touches edge 65B, housing 40 can no longer move toward end 61 of anchor plate 60. This position is defined as a rest or no tension position.

As tension is applied to seat belt 30, housing 40 will move away from end 61 of anchor plate 60 and spring 90 will start to be compressed. Housing 40 will move relative to anchor plate 60 and lever 212 will rotate, therefore magnet 110 will move relative to hall effect device 82.

As further tension is applied to seat belt 30, flange 43 will move into contact with edge 65A. After flange 43 touches edge 65A, housing 40 can no longer move away from end 61 of anchor plate 60. This position is defined as an overload position.

Any further tension applied to seat belt 30 after flange 43 engages edge 65B will be transferred to anchor plate 60 and bolt 200. The transfer of additional tension protects the overall sensor from damage. This can be referred to as overload protection.

As tension is relieved on seat belt 30 spring 90 forces housing 40 away from anchor plate 60 back toward the starting or no load position. At the same time, spring 222 forces lever 212 to rotate and moves lever end 214 away from edge 74. Therefore magnet 110 will move back toward the position when no tension is applied.

The use of seat belt tension sensor assembly 205 has many advantages. Seat belt tension sensor assembly 205 allows for the measurement of seat belt tension in a compact package with a small number of components. Seat belt tension sensor assembly 205 has a small amount of motion while still being able to determine the amount of tension in a seat belt.

Seat belt tension sensor assembly 205 can translate a small amount of sensor motion in to a large magnet movement such that a magnetic field sensor can accurately detect a changing magnetic field polarity while having adequate resolution to determine the amount of tension in a seat belt. This is a major advantage because a seat belt user does not like to feel a large amount of motion when the seat belt is pulled on. If the seat belt has a large amount of movement after being buckled, it can appear to the user that something is wrong with the seat belt. The use of lever 212 allows for the motion of the seat belt to be very small while providing enough magnet travel distance for the tension in the seat belt to be measured by the magnetic field sensor.

Seat belt tension sensor assembly 205 has an overload protection mechanism that prevents excessive seat belt tension from damaging the sensor.

The seat belt tension sensor of the present invention has additional advantages. It allows accurate sensing of seat belt tension, without excessive movement of the seat belt. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

Alternative Seat Belt Tension Sensor Embodiment Using a Lever

Figure 13:
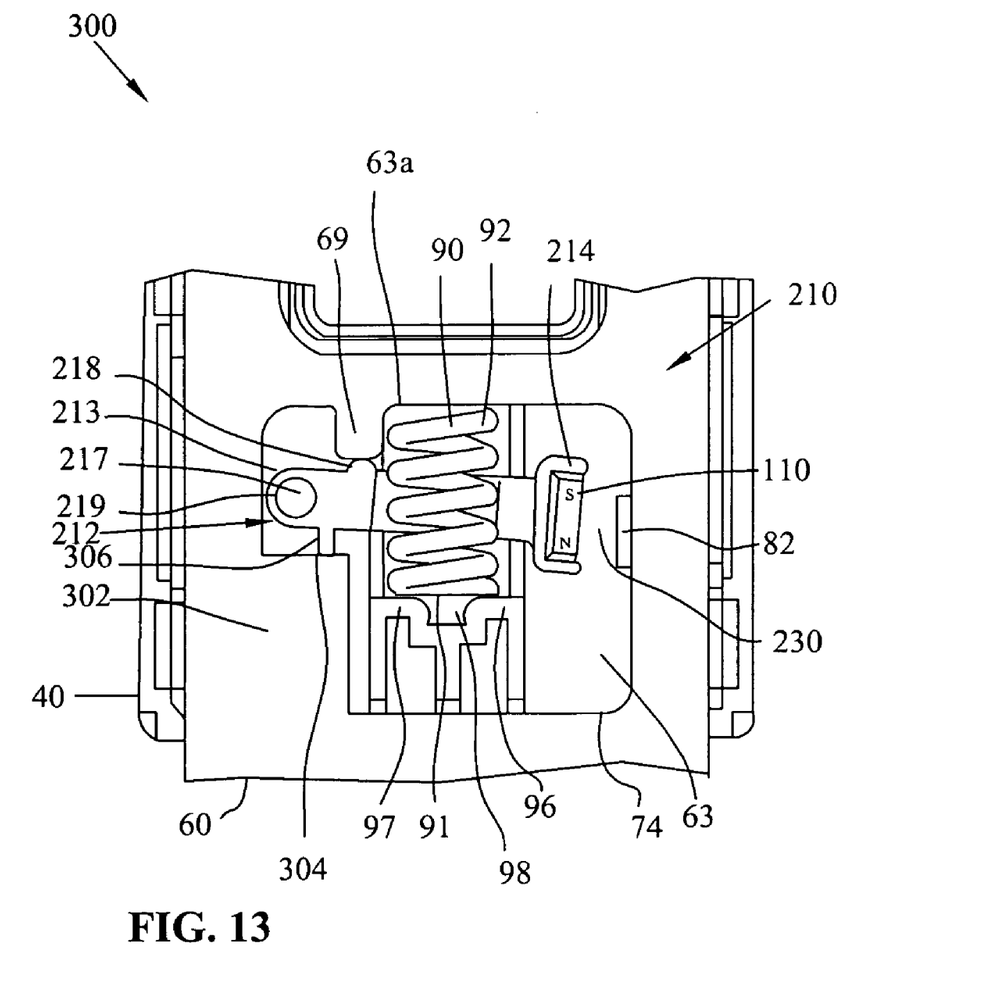

Referring to FIG. 13, a partial view of an alternative seat belt tension sensor assembly 300 is shown. Seat belt tension sensor assembly 300 is similar to seat belt tension sensor assembly 205 except that anchor plate 60 and lever 212 have a different shape and spring 222 has been eliminated.

Anchor plate 60 has been modified to include a step region 302 that extends into cutout 63. Step region 302 has a wall 304. Lever 212 includes an arm 306 that extends away from lever 212 toward wall 304. Arm 306 is adapted to be engaged with and contact wall 304. Lever 212 is effectively rotatably captured between projection 69 and wall 304 by the contact of projection 218 with projection 69 and by the contact of arm 306 with wall 304.

Seat belt tension sensor assembly 300 operates as follows: When tension is applied to seat belt 30, housing 40 moves relative to the fixed anchor plate 60 resulting in the compression of spring 90. As housing 40 moves, projection 218 is forced into contact with projection 69 causing the rotation of lever 212 about pin 217 which causes lever end 214 to move toward edge 74. At the same time hall effect device 82 is moved in the direction of seat belt tension. The anchor plate 60 is held in a fixed position by fastener 200.

As the tension in the seat belt increases, housing 40 will move further in relation to anchor plate 60. This causes lever 212 to rotate further, magnet 110 to rotate across hall effect device 82 and causes hall effect device 82 to further move.

Lever 212 causes the motion between housing 40 and anchor plate 60 to be translated. Housing 40 will typically travel a total distance of 1 millimeter when seat belt tension is applied. Lever 212 will translate force into motion. The 1 millimeter of motion between the housing and the anchor plate results in a total travel distance of 3 millimeters for lever end 214 and magnet 110. In other words, magnet 110 will travel a total distance of approximately 3 millimeters. The hall effect device is located adjacent to magnet 110. A small air gap 230 is located between hall effect device 82 and magnet 110.

The hall effect device outputs an electrical signal that is proportional to the flux density of the perpendicular magnetic field that passes through the device. The resulting electrical output signal of the hall effect devices changes in proportion to the amount of tension in seat belt 30.

The movement of housing 40 relative to the fixed anchor plate 60 is limited by the interaction of flange 43 with edges 65A and 65B as was previously described for assembly 205.

As tension is relieved on seat belt 30 spring 90 forces housing 40 away from anchor plate 60 back toward the starting or no load position. At the same time, wall 304 pressing on arm 306 forces lever 212 to rotate and moves lever end 214 away from edge 74. Therefore magnet 110 will move back toward the position when no tension is applied. Projection 218 and arm 306 allow the movement of housing 40 to move lever 212 in two directions, toward and away from edge 74.

The use of seat belt tension sensor assembly 300 eliminates the need for return spring 222.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor for attachment with a seat belt comprising:

a) a housing;
b) an anchor plate at least partially mounted in the housing, the housing being movable relative to the anchor plate;
c) a lever mounted to the housing, the lever rotating about an axis of rotation;
d) a magnet mounted to the lever; and
e) a sensor mounted to the housing, the sensor adapted to generate an electrical signal in response to relative movement between the magnet and the sensor, the electrical signal changing in proportion to the amount of tension on the seat belt.

2. The seat belt tension sensor according to claim 1, wherein the lever and the sensor are moveable relative to each other.

3. The seat belt tension sensor according to claim 1, wherein the lever has a pivot point that is affixed to the housing.

4. The seat belt tension sensor according to claim 3, wherein the lever has a first projection, the first projection engagable with the anchor plate such that movement of the housing causes the lever to rotate about the pivot point.

5. The seat belt tension sensor according to claim 1, wherein the anchor plate has a cutout, the lever being mounted in the cutout.

6. The seat belt tension sensor according to claim 5, wherein the anchor plate has a first and second aperture, the cutout located between the apertures.

7. The seat belt tension sensor according to claim 6, wherein the seat belt passes through the first aperture.

8. The seat belt tension sensor according to claim 6, wherein the housing has an apertured flange, the flange extending into the first aperture.

9. The seat belt tension sensor according to claim 5, wherein a second projection extends from the anchor plate into the cutout.

10. The seat belt tension sensor according to claim 1, wherein the lever has a cavity, the magnet mounted in the cavity.

11. The seat belt tension sensor according to claim 1, wherein a first spring is mounted between the anchor plate and the housing.

12. The seat belt tension sensor according to claim 1, wherein a second spring is mounted between the lever and the housing.

13. The seat belt tension sensor according to claim 1, wherein at least one terminal is mounted in the housing and extends between the sensor and a connector.

14. A sensor comprising:
a) housing means;
b) plate means at least partially mounted in the housing means;
c) lever means mounted to the housing means for translating motion, the lever means rotating about an axis of rotation, the plate means and the housing means preventing tension larger than a pre-determined magnitude from being applied to the lever means;
d) flux generating means for generating a flux field, the flux generating means connected to the lever means; and
e) sensor means for sensing the flux field, the sensor means connected to the housing means, the sensor means generating an electrical signal in response to relative movement between the flux generating means and the sensor means.

15. The sensor according to claim 14, wherein the sensor means moves in one direction and the flux generating means moves in the opposite direction.

16. A tension sensor for attachment with a belt comprising:
a) a housing;
b) an anchor plate at least partially mounted in the housing;
c) a lever mounted to the housing, the lever movable between a first position and a second position, the anchor plate and the housing preventing tension larger than a pre-determined magnitude from being applied to the lever;
d) a magnet held by the lever, the lever being adapted to move the magnet; and
e) a sensor mounted to the housing, the sensor juxtaposed to the magnet.

17. The tension sensor according to claim 16, wherein the lever has a cavity, the magnet mounted in the cavity.

18. The tension sensor according to claim 16, wherein a spring is mounted between the anchor plate and the housing, the spring being compressed as the housing moves away from the first position.

19. The tension sensor according to claim 16, wherein the lever has a spring slot, the spring passing through the spring slot.

20. The tension sensor according to claim 16, wherein the lever has a pivot point, the pivot point mounted to the housing such that the lever can rotate about the pivot point.

21. The tension sensor according to claim 16, wherein as tension is applied to the belt, the magnet moves in a first direction and the sensor moves in a second direction.

* * * * *